United States Patent
Gnabah

(10) Patent No.: US 12,273,009 B2
(45) Date of Patent: Apr. 8, 2025

(54) FLUID JACKET ASSEMBLY FOR STATOR

(71) Applicant: Schaeffler Technologies AG & Co. KG, Herzogenaurach (DE)

(72) Inventor: Zachary Gnabah, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 146 days.

(21) Appl. No.: 17/969,897

(22) Filed: Oct. 20, 2022

(65) Prior Publication Data

US 2024/0136884 A1 Apr. 25, 2024
US 2024/0235317 A9 Jul. 11, 2024

(51) Int. Cl.
*F28D 15/00* (2006.01)
*F28F 9/02* (2006.01)
*F28F 9/18* (2006.01)
*F28F 13/12* (2006.01)
*H02K 5/20* (2006.01)

(52) U.S. Cl.
CPC .......... *H02K 5/203* (2021.01); *F28F 9/0224* (2013.01); *F28F 9/18* (2013.01); *F28F 13/12* (2013.01)

(58) Field of Classification Search
CPC .......... H02K 5/203; F28F 9/0224; F28F 9/18; F28F 13/12
USPC ....................................... 165/104.19
See application file for complete search history.

(56) References Cited

FOREIGN PATENT DOCUMENTS

EP 0179616 A2 * 4/1986

* cited by examiner

*Primary Examiner* — Davis D Hwu
(74) *Attorney, Agent, or Firm* — Volpe Koenig

(57) ABSTRACT

A fluid jacket is disclosed herein that generally includes an enclosure component and a stator carrier to define a fluid pocket. Indentations, embossments, or other features can be defined on one of the enclosure component or the stator carrier to provide a more turbulent flow within the fluid pocket. The enclosure component and stator carrier can be laser welded to each other. A constriction can also be defined within the fluid pocket, which can be formed via a relative flattening to straight portion of the enclosure component or the stator carrier. This constriction can effectively restrict the flow of fluid within the fluid pocket, thereby ensuring that fluid is directed circumferentially around the fluid pocket.

15 Claims, 8 Drawing Sheets

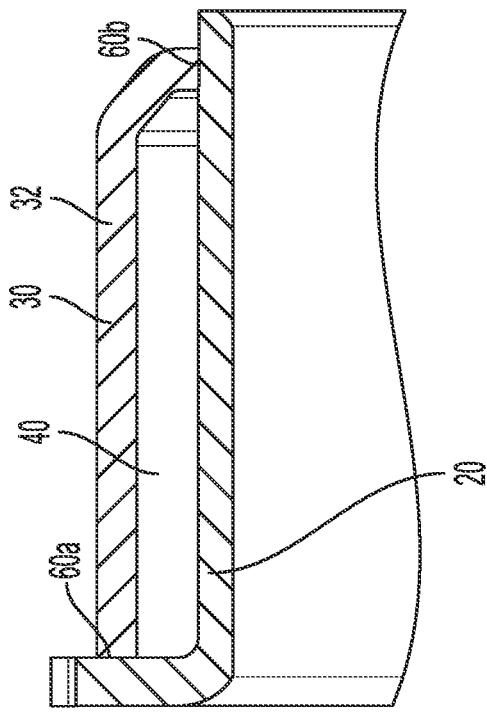
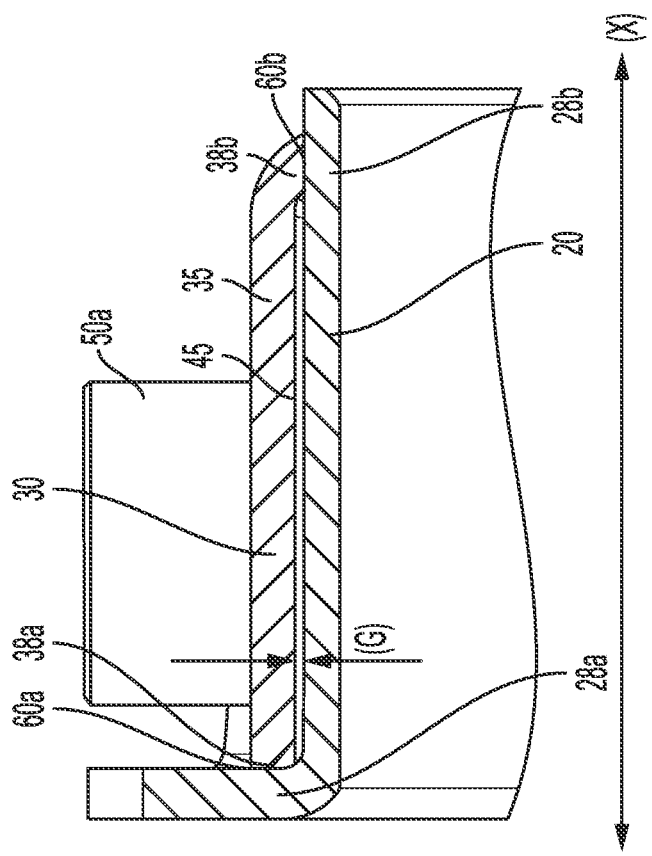

FLUID JACKET ASSEMBLY FOR STATOR

FIELD OF INVENTION

The present disclosure relates to a fluid jacket assembly, and more particularly relates to a fluid jacket assembly for a stator arrangement.

BACKGROUND

Fluid jackets, which are also referred to herein as water jackets, are well known and can be used in a wide variety of applications to provide heat transfer features. Fluid jackets can include a pocket for circulating fluid, as well as an inlet and an outlet. The pathway defined within fluid jackets can include separators or other flow directing components to ensure that the fluid flows according to a desired pattern or pathway.

It would be desirable to provide a fluid jacket arrangement having an improved fluid directing configuration that is relatively simple to assemble and does not require installation of additional components.

SUMMARY

A fluid jacket assembly is disclosed herein. The fluid jacket assembly can include a stator carrier comprising an annular carrier body, and an enclosure component including an annular body. The enclosure component can be a jacket, in one example, or could be a housing in another example. A fluid pocket can be defined between the stator carrier and the enclosure component. A first conduit can be configured to provide a flow path in to the fluid pocket, and a second conduit can be configured to provide a flow path out of the fluid pocket. The fluid pocket can have a constriction defined at least in an area between the first conduit and the second conduit. The constriction can generally ensure that fluid within the fluid pocket is directed circumferentially around the fluid pocket as it enters and exits the conduits.

At least one of the jacket or the stator carrier can include at least one embossment configured to project into the fluid pocket. The embossment can include a plurality of embossments circumferentially spaced apart from each other. The embossment can have an oblong profile. The at least one embossment can be spaced away from the constriction.

The constriction can be formed via a flat section of the enclosure component, and the annular body of the enclosure component can have a circular profile in areas away from the flat section.

A gap of 0.5 mm-1.0 mm can be defined between adjacent or facing surfaces of the flat section of the enclosure component and the annular carrier body of the stator carrier. In some embodiments, this distance can be 0 mm, or 0 mm-0.5 mm. In one embodiment, this distance is 0.50 mm-0.60 mm.

The jacket can define a first opening configured to receive a portion of the first conduit, and a second opening to receive a portion of the second conduit. The conduits can be press-fit within these openings to secure the conduits thereon. The first opening and the second opening can be formed on the flat section of the jacket.

The constriction can reduce an area of the fluid pocket by at least 80% compared to areas of the fluid pocket away from the constriction. This reduction can vary, depending on the specific requirements of an application.

The stator carrier and the jacket can be laser welded together, in one example. For example, a first welded connection can be defined between a radial section of the stator carrier and an axial section of the jacket, and a second welded connection can be defined between an axial section of the stator carrier and a radial section of the jacket.

In another configuration, a fluid jacket assembly is provided that includes a stator carrier comprising an annular carrier body, a jacket comprising an annular jacket body, and a fluid pocket defined between the stator carrier and the jacket, wherein the fluid pocket has a constriction defined by a flat section of the jacket. The jacket can include a plurality of embossments configured to project into the fluid pocket. The plurality of embossments can be defined around an entire periphery of the jacket in regions away from the constriction.

In another aspect, the constriction can be provided via an indentation or embossment formed on the flat section of the jacket.

The constriction can reduce an area of the fluid pocket by at least 85% compared to areas of the fluid pocket defined between the annular carrier body and the annular jacket body away from the constriction. The embossments can have an axial extent that covers a majority of a radially outer surface of the jacket.

The stator carrier and the jacket can be laser welded together via a first welded connection and a second welded connection. The fluid pocket can be defined in a radially inner direction via the stator carrier, defined in a radially outer direction via the jacket, defined in a first axial direction via the stator carrier, and defined in a second axial direction via the jacket.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 5A is a cross-sectional view through a region of the fluid jacket assembly including a constriction.

FIG. 5B is a cross-sectional view through a region of the fluid jacket assembly away from the constriction.

DETAILED DESCRIPTION OF THE PREFERRED EMBODIMENTS

Figure 1:
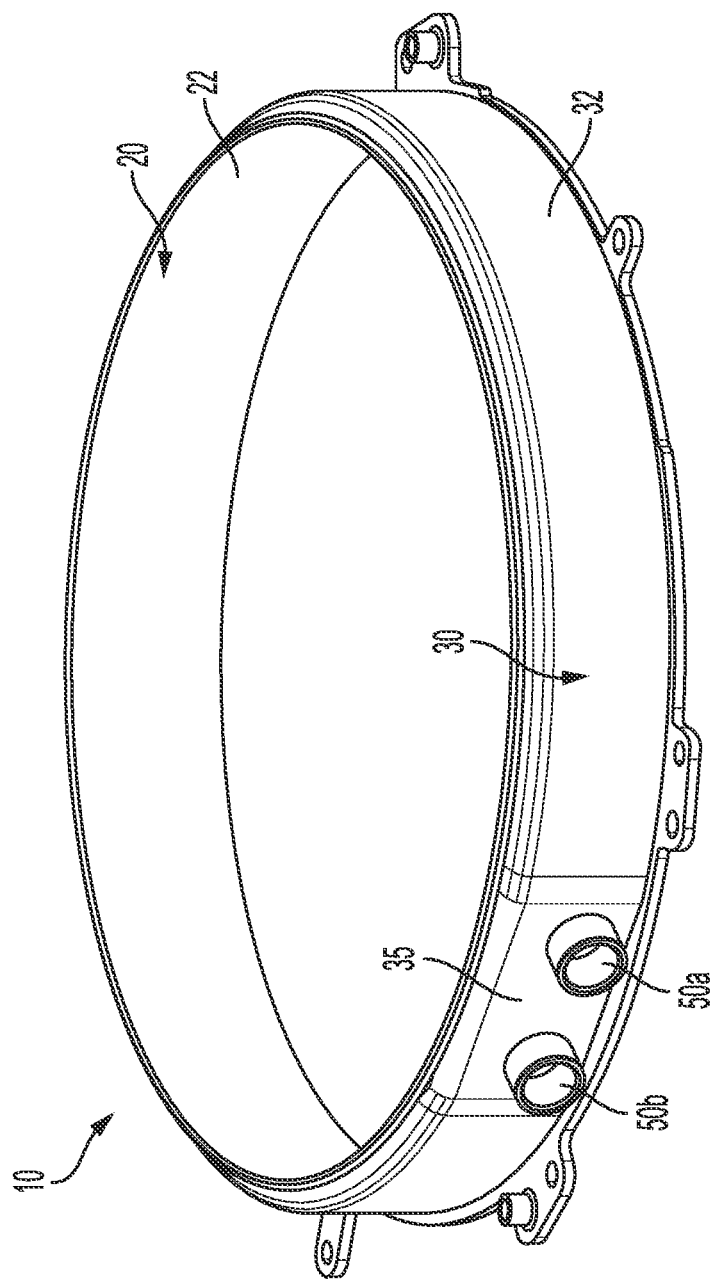
FIG. 1 is a perspective view of a fluid jacket assembly according to a first example.

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1-5B, a fluid jacket assembly 10 is disclosed herein. In one configuration, the fluid jacket assembly 10 is configured to use water as the fluid, but one of ordinary skill in the art would understand that other fluids or materials can be used.

The fluid jacket assembly 10 can include a stator carrier 20 comprising an annular carrier body 22. The fluid jacket assembly 10 can include an enclosure component, which can be configured to be arranged radially outward from the stator carrier 20. The term enclosure component refers to a body, such as a jacket, housing, ring, or other structure that can be configured to be arranged concentrically about the stator carrier, in one example. The enclosure component can comprise a jacket 30 comprising an annular jacket body 32 or a housing 230 comprising an annular housing body 232.

The annular carrier body 22 can be arranged radially inward from the enclosure component, in one example. One of ordinary skill in the art would understand that other arrangements of the stator carrier 20 and the jacket 30 can be used, or in other configurations, there could be different components that perform similar functions as the stator carrier 20 and the jacket 30.

A fluid pocket 40 is generally defined between the stator carrier 20 and the enclosure component. The entire boundary of the fluid pocket 40 can be defined by either the stator carrier 20 or the enclosure component. In one example, the fluid pocket 40 is defined in a radially inner direction via the stator carrier 20, is defined in a radially outer direction via the enclosure component, is defined in a first axial direction via the stator carrier 20, and is defined in a second axial direction via the enclosure component.

A first conduit 50a can be configured to provide a flow path in to the fluid pocket 40, and a second conduit 50b can be configured to provide a flow path out of the fluid pocket 40. The first and second conduits 50a, 50b can generally be arranged adjacent to each other. In one example, the first and second conduits 50a, 50b can define radially extending ports, inlets, or outlets relative to the fluid pocket 40. The first and second conduits 50a, 50b can be formed as annular sleeves.

The fluid pocket 40 can have a constriction 45 defined at least in an area between the first conduit 50a and the second conduit 50b. The constriction 45 can be defined as a reduction or restriction in the fluid pocket 40, wherein the boundary of the fluid pocket 40 is less than the boundary of the fluid pocket 40 in other circumferential areas between the stator carrier 20 and the enclosure component. The constriction 45 can include the narrowest area between the stator carrier 20 and the enclosure component, as well as the immediately adjacent areas. The constriction 45 can be provided via a relative flattening of a portion of the stator carrier 20 and/or the enclosure component. For example, the constriction 45 can be formed via a flat section 35 of the jacket 30 or a flat section 235 of the housing 230.

The flat section 35 of the jacket 30 can include a medial region 35a that is defined between the first and second conduits 50a, 50b, and a first end region 35b defined circumferentially outward relative to the first conduit 50a and a second end region 35c defined circumferentially outward relative to the second conduit 50b. The first and second end regions 35b, 35c can transition to the circular profile of the annular jacket body 32. The medial region 35a of the flat section 35 can have an extent that is equal to or greater than a diameter of the first and second conduits 50a, 50b, in one example. A portion of the annular carrier body 22 facing the flat section 35 can have a continuously circular profile, in one example. Accordingly, the flat section 35 can extend essentially tangentially to the annular carrier body 22, except for a gap (G) defined therebetween.

At least one of the jacket 30 or the stator carrier 20 can include at least one embossment 34 configured to project into the fluid pocket 40. In one configuration, shown in FIGS. 2 and 3, the jacket 30 includes the embossments 34. In another configuration, shown in FIG. 6, the stator carrier 120 includes the embossments 134. In one configuration, both of the jacket 30 and the stator carrier 20 can include embossments. The housing 230 could also include embossments, as one of ordinary skill in the art would appreciate from this disclosure.

The embossment 34 can include a plurality of embossments 34 that are circumferentially spaced apart from each other. The embossments 34 can have an oblong profile, in one example. The embossments 34 can have an axial extent that covers a majority of a radially outer surface of the jacket 30. One of ordinary skill in the art would understand that the shape, positioning, profile, length, depth, width, etc. of the embossments 34 can vary. The at least one embossment 34 or embossments 34 can be spaced away from the constriction 45, in one example.

Figure 6:
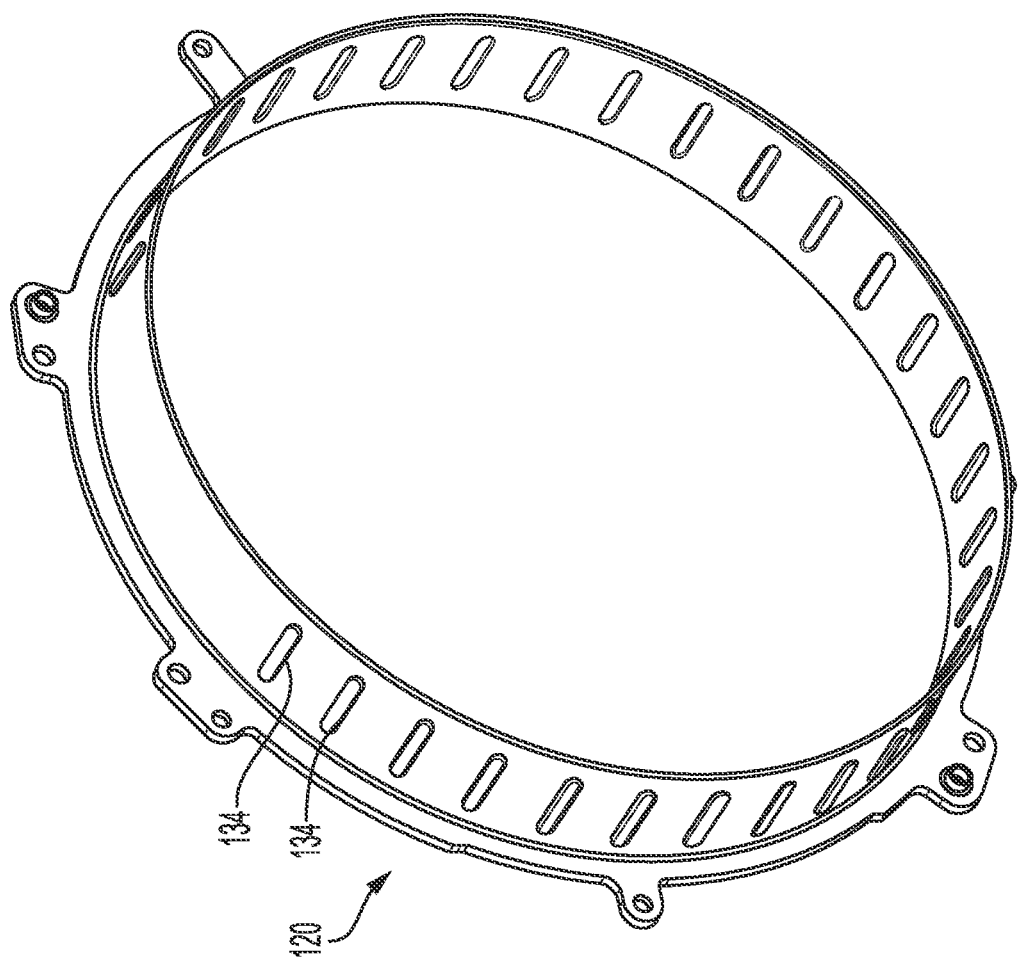
FIG. 6 is a perspective view of a stator carrier according to another embodiment.
Figure 7A:
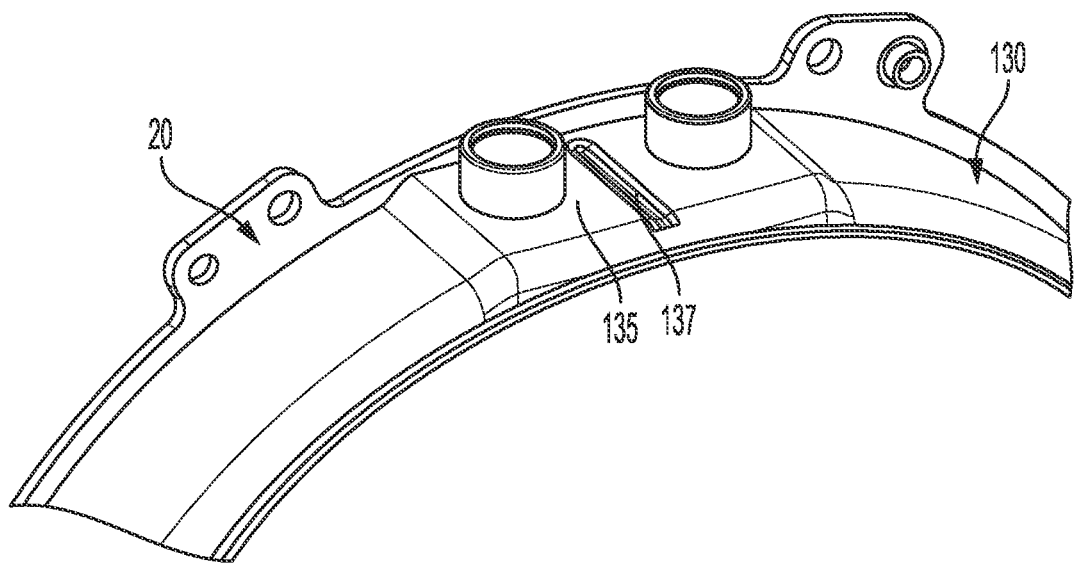
FIG. 7A is a perspective view of a fluid jacket assembly according to another embodiment.
Figure 7B:
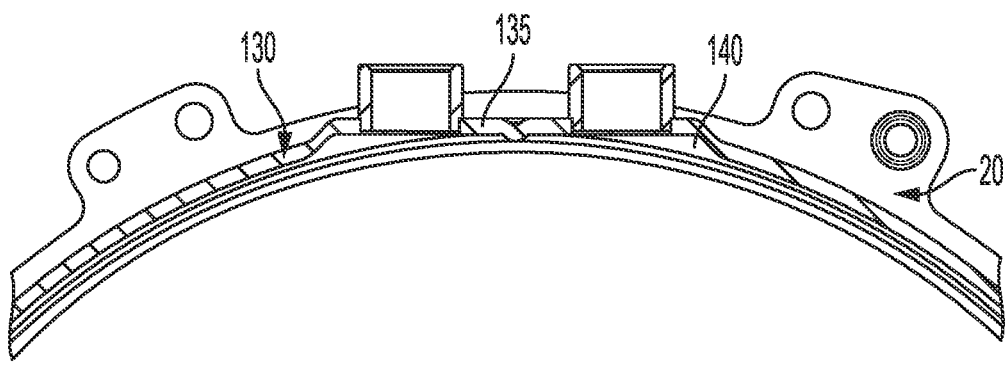
FIG. 7B is a cross-sectional view of the fluid jacket assembly from FIG. 7A.

A gap (G) of 0.50 mm-0.60 mm can be defined between adjacent surfaces of the flat section 35 of the jacket 30 and the stator carrier 20 in an area of the constriction 45. One of ordinary skill in the would understand that this gap (G) can be zero in some examples, i.e. in which the flat section 35 is tangential to the annular carrier body 22. In other embodiments, such as shown in FIGS. 6, 7A, and 7B, this gap (G) can be 0 mm.

The jacket 30 can define a first opening 36a configured to receive a portion of the first conduit 50a, and a second opening 36b to receive a portion of the second conduit 50b. The first and second conduits 50a, 50b can be press fit into the openings 36a, 36b defined on the jacket 30. The connection between the first and second conduits 50a, 50b and the first and second openings 36a, 36b have a sealed interface or perimeter such that fluid can flow through the first and second conduits 50a, 50b via the first and second openings 36a, 36b. The first opening 36a and the second opening 36b can be formed on the flat section 35 of the jacket 30.

In one example, the constriction 45 reduces an area of the fluid pocket 40 by at least 80% compared to areas of the fluid pocket 40 away from the constriction 45. In another example, the constriction 45 reduces an area of the fluid pocket 40 by at least 85% compared to areas of the fluid pocket 40 away from the constriction 45.

A connection between the stator carrier 20 and the jacket 30 can be provided via a welded connection, such as laser welding. In one configuration, a first welded connection 60a is defined between a radial section 28a of the stator carrier 20 and an axial section 38a of the jacket 30, and a second welded connection 60b is defined between an axial section 28b of the stator carrier 20 and a radial section 38b of the jacket 30. The specific interface for the welded connection between the stator carrier 20 and the jacket 30 can vary.

The stator carrier 20 and the jacket 30 can each be formed as stamped components, in one example. One of ordinary skill in the art would understand that just one of these components can be a stamped component. At least one of the stator carrier 20 or the jacket 30 can be formed as a stamped steel component.

Figure 2:
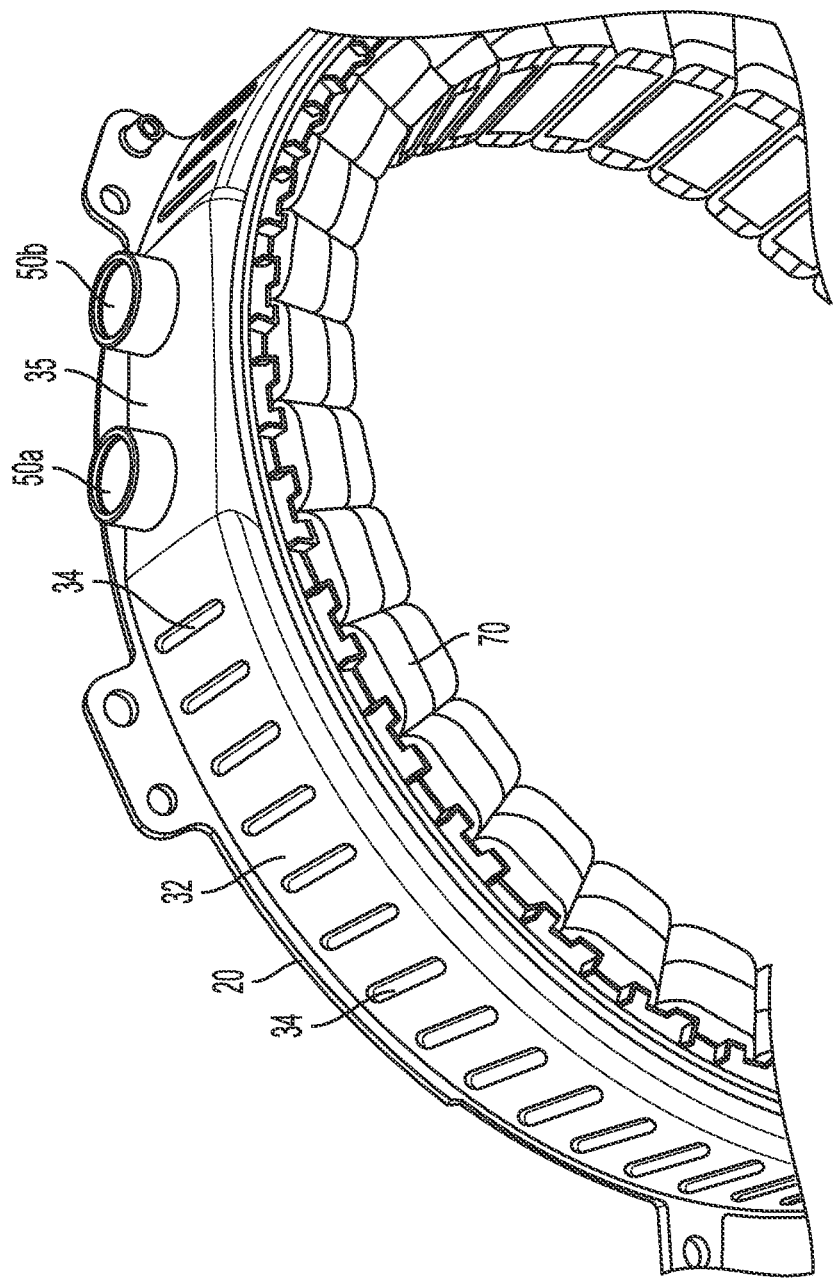
FIG. 2 is a perspective view of a fluid jacket assembly installed with a stator.
Figure 3:
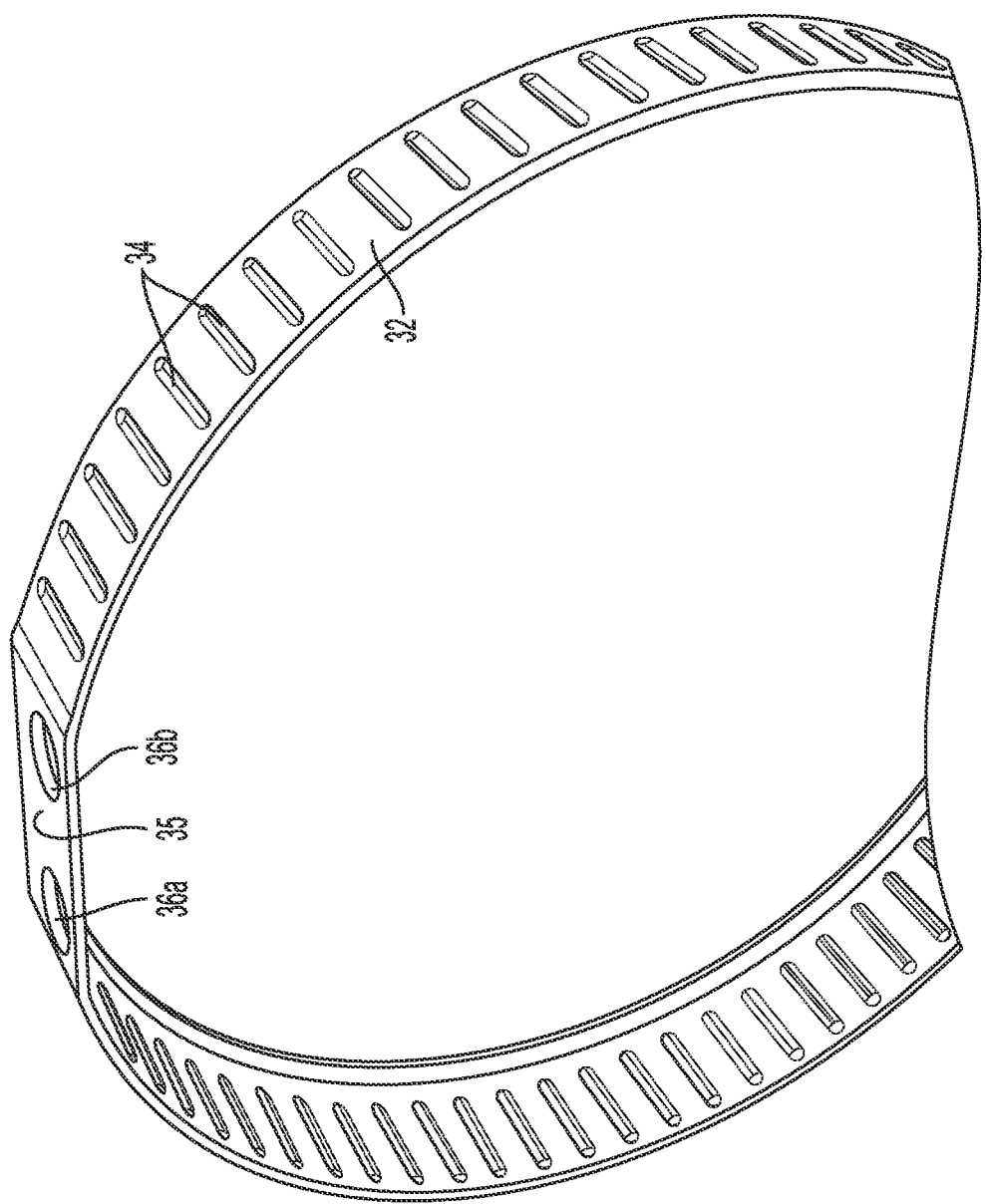
FIG. 3 is a perspective view of a jacket for a fluid jacket assembly in a pre-installed condition.

The stator carrier 20 can be configured to support, carry, or otherwise interface with aspects of a stator. As shown in FIG. 2, a stator core 70 can be arranged radially inward from the stator carrier 20. The stator core 70 can be retained via a shrink fit/interference fit process, in some examples.

Figure 4:
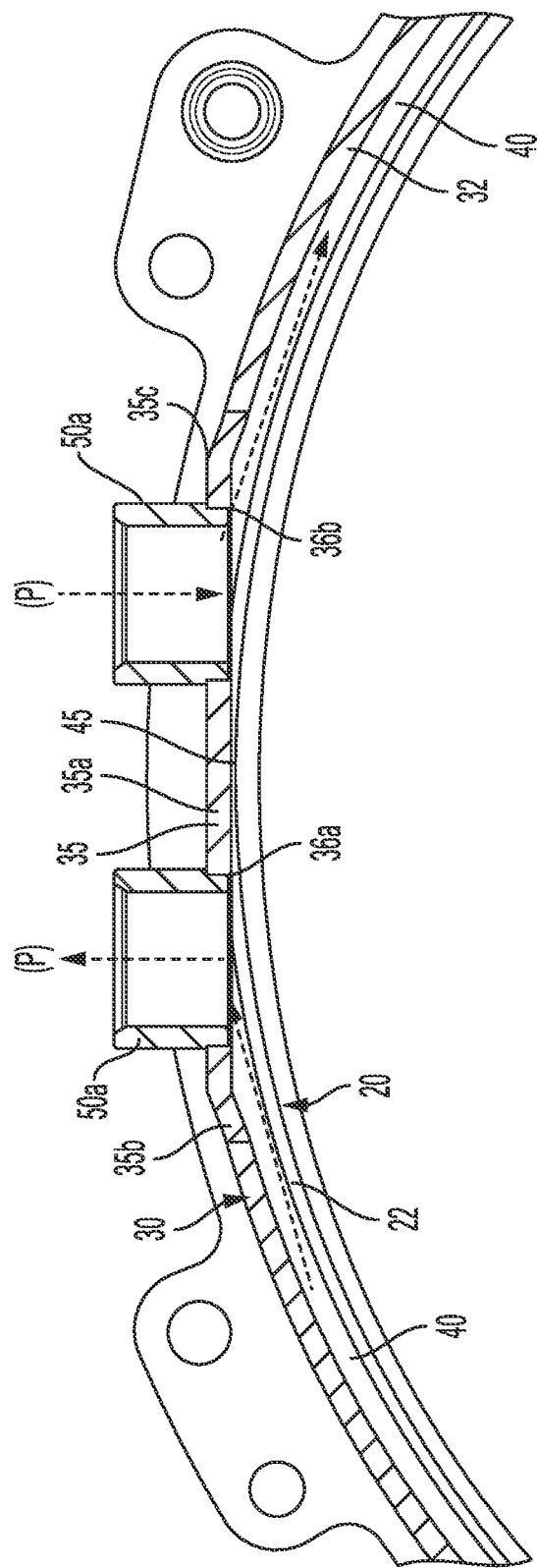
FIG. 4 is a cross-sectional view of a fluid jacket assembly through a region of the fluid jacket assembly including conduits and a constriction.

Based on the configuration disclosed herein, thermal energy or heat from the stator core 70 can be transferred through the stator carrier 20 to fluid within the fluid pocket 40 and thereby the stator core 70 can be cooled. Fluid can be circulated through the fluid pocket 40 in a generally unidirectional circumferential flow path such that the fluid enters through one of the fluid conduits 50a, 50b and exits through the other one of the fluid conduits 50a, 50b. The constriction 45 in the fluid pocket 40 promotes this unidirectional flow by effectively blocking fluid flow. The embossments 34 promote a turbulent flow within the fluid pocket 40 to further increase the heat transfer capability of the fluid pocket 40 to cool the stator core 70. Portions of an exemplary flow path (P) are illustrated in FIG. 4 via dashed lines. One of ordinary skill in the art would understand that the exact flow path (P) can vary.

One of ordinary skill in the art would understand that the embossments 34 can be omitted in some examples. For example, as shown in FIGS. 7A and 7B, the jacket 130 lacks any embossments. In this embodiment, the jacket 130 can include a flat section 135 that includes an indentation 137 in a medial region of the flat section 135. This indentation 137 effectively divides the fluid pocket 140 into different sections or areas, and can provide a similar or the same effect as the constriction 45. Instead of making the flat section 35 be essentially tangential to the stator carrier 20, the indentation 137 can directly contact the stator carrier 20 such that a gap (G) between the stator carrier 20 and the jacket 130 is 0 mm, in one example.

Figure 8A:
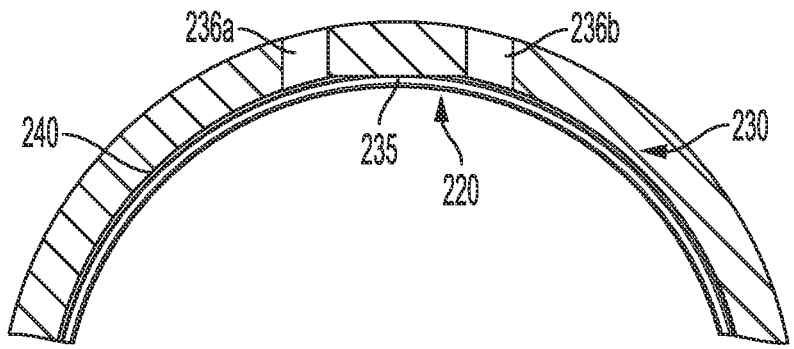
FIG. 8A is a cross-sectional view of a fluid jacket assembly including a housing.
Figure 8B:
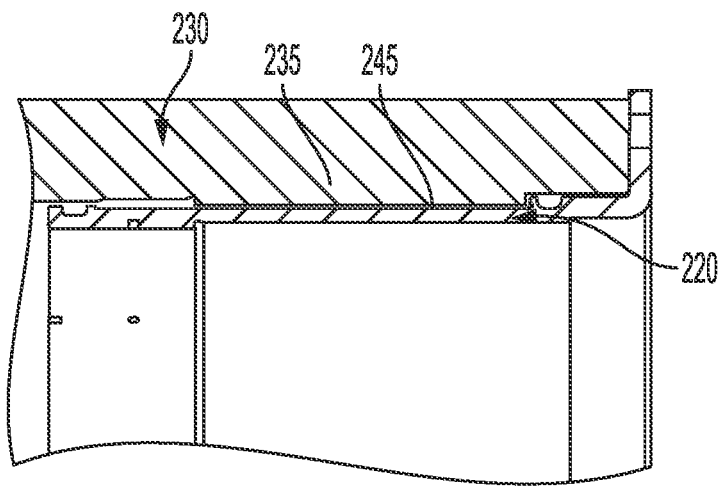
FIG. 8B is a cross-sectional view through a flat section of the housing of the fluid jacket assembly of FIG. 8A.
Figure 8C:
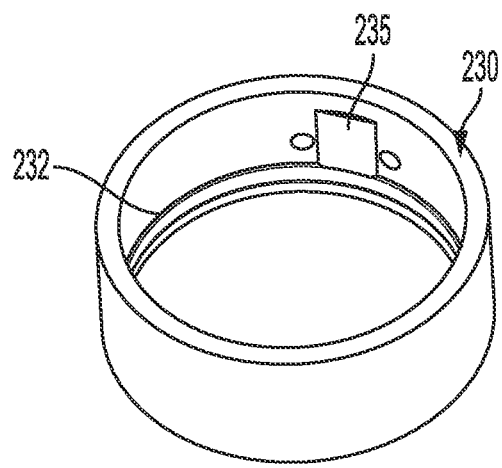
FIG. 8C is a perspective view of the housing of FIGS. 8A and 8B.

In one example, as shown in FIGS. 8A-8C, the enclosure component can comprise a housing 230 that is configured to surround the stator carrier 220. The housing 230 can include a flat section 235 defined along an interior surface of the annular housing body 232. In an installed state, when the housing 230 surrounds the stator carrier 220, a fluid pocket 240 is defined in a radial space between the stator carrier 220 and the housing 230. Along the fluid pocket 240, the flat section 235 defines a constriction 245, which has similar properties, functions, etc., as the constriction 45 described herein. Although not specifically illustrated, one of ordinary skill in the art would understand that seals, o-rings, and other interfacing components can be provided between the stator carrier 220 and the housing 230. All other aspects of the embodiment of FIGS. 8A-8C are similar to the embodiments having a jacket 30, unless otherwise specified herein. The housing 230 can also include openings 36a, 236b for defining a fluid inlet and outlet.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS fluid jacket assembly 10
stator carrier 20, 120, 220
annular carrier body 22
radial section 28a of the stator carrier
axial section 28b of the stator carrier
jacket 30, 130
annular jacket body 32
embossment 34, 134
flat section 35, 135, 235
medial region 35a of flat section
end regions 35b, 35c of flat section
first opening 36a, 236a
second opening 36b, 236b
axial section 38a of the jacket
radial section 38b of the jacket
fluid pocket 40, 240
constriction 45, 245
first conduit 50a
second conduit 50b
first welded connection 60a
second welded connection 60b
stator core 70
indentation 137
housing 230

What is claimed is:

1. A fluid jacket assembly comprising:
   a stator carrier comprising an annular carrier body;
   an enclosure component defining an annular body;
   a fluid pocket defined between the stator carrier and the enclosure component;
   a fluid inlet configured to define a flow path in to the fluid pocket; and
   a fluid outlet configured to define a flow path out of the fluid pocket;
   wherein the fluid pocket has a constriction defined at least in an area between the fluid inlet and the fluid outlet;
   wherein the constriction is formed via a flat section of the enclosure component;
   wherein the annular body has a circular profile in areas away from the flat section; and
   wherein a first opening and a second opening are formed on the flat section of the enclosure component on opposite sides of the constriction.

2. The fluid jacket assembly according to claim 1, wherein the enclosure component comprises a jacket, and at least one of the jacket or the stator carrier includes at least one embossment configured to project into the fluid pocket.

3. The fluid jacket assembly according to claim 2, wherein the at least one embossment includes a plurality of embossments circumferentially spaced apart from each other.

4. The fluid jacket assembly according to claim 2, wherein the at least one embossment has an oblong profile.

5. The fluid jacket assembly according to claim 2, wherein the at least one embossment is spaced away from the constriction.

6. The fluid jacket assembly according to claim 1, wherein a gap of 0.5 mm-1.0 mm is defined between adjacent surfaces of the flat section of the enclosure component and the annular carrier body of the stator carrier.

7. The fluid jacket assembly according to claim 1, wherein the enclosure component comprises a jacket, and the jacket defines the first opening configured to receive a portion of a first conduit, and the second opening configured to receive a portion of a second conduit.

8. The fluid jacket assembly according to claim 1, wherein the constriction reduces an area of the fluid pocket by at least 80% compared to areas of the fluid pocket away from the constriction.

9. The fluid jacket assembly according to claim 1, wherein the enclosure component comprises a jacket, and the stator carrier and the jacket are welded together.

10. The fluid jacket assembly according to claim 1, wherein the enclosure component comprises a housing.

11. The fluid jacket assembly according to claim 1, wherein the annular carrier body includes an axial section having a cylindrical cross-sectional shape.

12. A fluid jacket assembly comprising:
a stator carrier comprising an annular carrier body;
an enclosure component defining an annular body;
a fluid pocket defined between the stator carrier and the enclosure component;
a fluid inlet configured to define a flow path in to the fluid pocket; and
a fluid outlet configured to define a flow path out of the fluid pocket;
wherein the fluid pocket has a constriction defined at least in an area between the fluid inlet and the fluid outlet; and
wherein the enclosure component comprises a jacket, and at least one of the jacket or the stator carrier includes at least one embossment configured to project into the fluid pocket.

13. The fluid jacket assembly according to claim 11, wherein the at least one embossment includes a plurality of embossments circumferentially spaced apart from each other.

14. The fluid jacket assembly according to claim 11, wherein the at least one embossment has an oblong profile.

15. The fluid jacket assembly according to claim 11, wherein the at least one embossment is spaced away from the constriction.

* * * * *